United States Patent [19]

Dobson et al.

[11] Patent Number: 4,936,955
[45] Date of Patent: Jun. 26, 1990

[54] HYDROFLUORIC ACID REPROCESSING FOR SEMICONDUCTOR STANDARDS

[75] Inventors: Jesse Dobson; Marshall McCormick, both of Oakland, Calif.

[73] Assignee: Alameda Instruments, Inc., Pleasanton, Calif.

[21] Appl. No.: 231,850

[22] Filed: Aug. 12, 1988

[51] Int. Cl.$^5$ .................. B01D 3/10; C01B 7/19
[52] U.S. Cl. .................. 203/40; 203/12; 203/80; 203/86; 203/98; 203/99; 203/DIG. 9; 156/642; 202/154; 202/176; 202/197; 202/202; 423/483; 423/488; 423/484; 159/DIG. 15; 159/DIG. 19

[58] Field of Search .................. 203/73, 80, 40, 99, 203/86, 98, 12, DIG. 2, DIG. 9; 423/488, 484, 483; 156/642; 159/DIG. 19, DIG. 15, 47.3; 134/12; 202/202, 197, 267, 154, 176

[56] References Cited

U.S. PATENT DOCUMENTS

| 556,040 | 3/1896 | Alberger | 159/DIG. 15 |
|---|---|---|---|
| 1,903,408 | 4/1933 | Soll | 203/29 |
| 2,485,048 | 10/1949 | Guinot | 202/154 |
| 2,993,757 | 7/1961 | Dasher et al. | 423/484 |
| 3,166,379 | 1/1965 | Bradley et al. | 423/484 |
| 3,271,273 | 9/1966 | Fox et al. | 203/12 |
| 3,294,650 | 12/1966 | Manteufel | 159/DIG. 19 |
| 3,342,703 | 9/1967 | Leach | 203/4 |
| 3,689,370 | 9/1972 | Osaka et al. | 203/33 |
| 3,696,003 | 10/1972 | Fitch et al. | 203/4 |
| 3,839,534 | 10/1974 | Matsumoto et al. | 156/642 |
| 3,933,575 | 1/1976 | Guth et al. | 423/531 |
| 3,972,987 | 8/1976 | von Plessen et al. | 423/531 |
| 4,008,130 | 2/1977 | Leathers et al. | 203/53 |
| 4,045,295 | 8/1977 | Schafer et al. | 423/531 |
| 4,125,594 | 11/1978 | Su et al. | 156/642 |
| 4,138,309 | 2/1979 | Kuhnlein et al. | 159/DIG. 15 |
| 4,160,692 | 7/1979 | Mitchell et al. | 159/DIG. 15 |
| 4,233,281 | 11/1980 | Hirko et al. | 203/12 |
| 4,235,677 | 11/1980 | Karamian | 203/86 |
| 4,329,155 | 5/1982 | Schlegel | 203/12 |
| 4,395,302 | 7/1983 | Courduvelis | 156/642 |
| 4,406,745 | 9/1983 | Martel | 202/197 |
| 4,409,064 | 10/1983 | Vora et al. | 202/197 |
| 4,584,062 | 4/1986 | Sussmeyer et al. | 202/197 |
| 4,655,879 | 4/1987 | Brockmann et al. | 203/99 |
| 4,828,660 | 5/1989 | Clark et al. | 204/82 |
| 4,855,023 | 8/1989 | Clark et al. | 204/130 |

FOREIGN PATENT DOCUMENTS 139306 10/1960 U.S.S.R. .................. 423/484

Primary Examiner—Wilbur Bascomb
Attorney, Agent, or Firm—Blakely, Sokoloff, Taylor & Zafman

[57] ABSTRACT

A two-step distillation process provides semiconductor purity, concentrated hydrofluoric acid. Further, the distillation process, occurring under reduced pressures eliminates essentially pure water after the first distillation step. The product output of the second distillation process provides an acid of weight percent greater than 27 weight percent. The product acid is carefully diluted to the required concentrations during the dilution step.

13 Claims, 3 Drawing Sheets

HYDROFLUORIC ACID REPROCESSING FOR SEMICONDUCTOR STANDARDS

BACKGROUND

1. Field of Invention

The present invention relates to the reprocessing of hydrofluoric acid to the proper purity and weight percent for reuse in the semiconductor manufacturing industry.

2. Prior Art

Hydrofluoric acid (HF) may be used as an acid etchant for removing silicon dioxide or similarly composed substances from semiconductor devices in a bath during the manufacture of these devices. Typically, these semiconductor devices are placed in a bath containing HF to permit the acid to remove the silicon dioxide ($SiO_2$). Once the etchant is spent, that is becomes essentially ineffective, the etchant acid must be replaced with clean (effective) hydrofluoric acid. Traditionally, the spent acid was drained from the bath and disposed of, then clean, new hydrofluoric acid (HF) was added to the bath. Since hydrofluoric acid is highly corrosive and highly toxic, considerable care must be taken in disposing of the spent acid.

Distillation of HF is one alternative for reprocessing the spent acid for reuse. The distillation of HF at atmospheric pressures requires the use of special equipment and procedures. Since hydrofluoric acid attacks glass and any silica-containing materials, the use of these materials for distillation purposes is prohibited. Distillation vessels and conduit lines fashioned from stainless or other alloy steels is likewise prohibited due to the nature of the semiconductor industry. Semiconductor grade acid must be essentially free of metal contaminants, e.g., no greater than 500 ppb of metal contaminants.

It is appreciated that what is needed is an effective method for recycling spent hydrofluoric acid while providing a reprocessed HF that meets semiconductor industry standards and without incurring prohibitive costs for reprocessing HF, thus making the process commercially feasible.

The present invention describes a novel two-step distillation process which produces hydrofluoric acid that possesses both the purity and the requisite dilution of hydrofluoric acid for the semiconductor industry, at a cost that is justifiable for these industries.

SUMMARY OF THE INVENTION

The present invention describes a novel two-step process for recycling and purifying hydrofluoric acid spent during a semiconductor etching process. The spent acid is mixed with a measured amount of makeup acid to form a combined solution of acid. The measured amount is sufficient to compensate for acid used during prior use of the acid (in this example to a concentration at 7 weight percent of hydrofluoric acid). Next this combined solution of acid is fed into the first distillation column which operates at reduced pressure. The combined solution is then heated such that part of it vaporizes and passes through the column packing of the first column. The vapor is condensed in a condenser coupled to the output of the distillation column. Once condensed, some of the water is returned as a reflux trickle to allow that all of the condensed vapor sent to waste is essentially pure water, while the remainder is discarded as waste. The concentrated combined solution remaining in the first distillation column is pumped to the second distillation column. Like the first column, the second column is advantageously operated below atmospheric pressure. Much of the HF in the concentrated combined solution is boiled over as hydrofluoric acid vapor. The vapor is condensed in a condenser coupled to the gaseous output of the second distillation column. The condensed hydrofluoric acid is collected in a product collection tank. The concentrated solution remaining in the second distillation column is discarded periodically and automatically as concentrated waste.

From the product collection tank, the recycled acid is sent to the mix tank coupled to the output of the product collection tank. In the mix tank, the recycled acid is diluted to the desired concentration. From the mix tank, the diluted acid is then moved to a transfer tank where the clean-diluted acid is held until needed.

DETAILED DESCRIPTION OF THE PRESENT INVENTION

Figure 2:
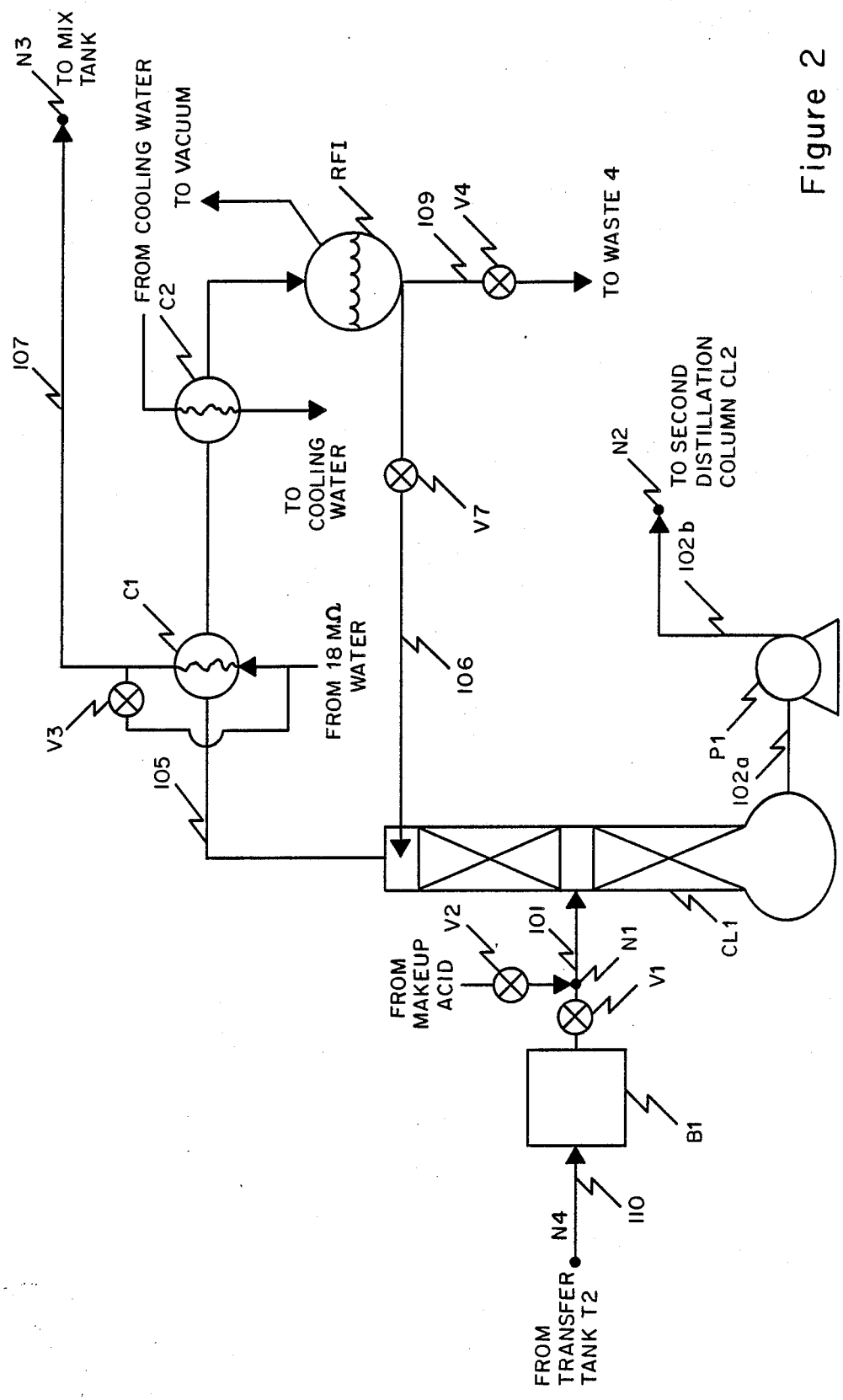
FIG. 2. Schematic representation of the input system, the first distillation column and condensation loop.

The present invention describes a method for reprocessing hydrofluoric acid (HF) at reduced pressure and temperature, thereby allowing for the use of plastic vessels and conduit lines (e.g. pipes). In the following description, numerous specific details are set forth such as specific temperatures, pressures, etc., in order to provide a thorough understanding of the present invention. It will be obvious, however, to one skilled in the art that the present invention may be practiced without these specific details. In other instances, well-known processes have not been described in detail in order not to unnecessarily obscure the present invention. In addition to the designations of the various flasks, columns, etc. node markers, for example N1 as shown in FIG. 2, are indicated to guide the reader from figure to figure.

Figure 1:
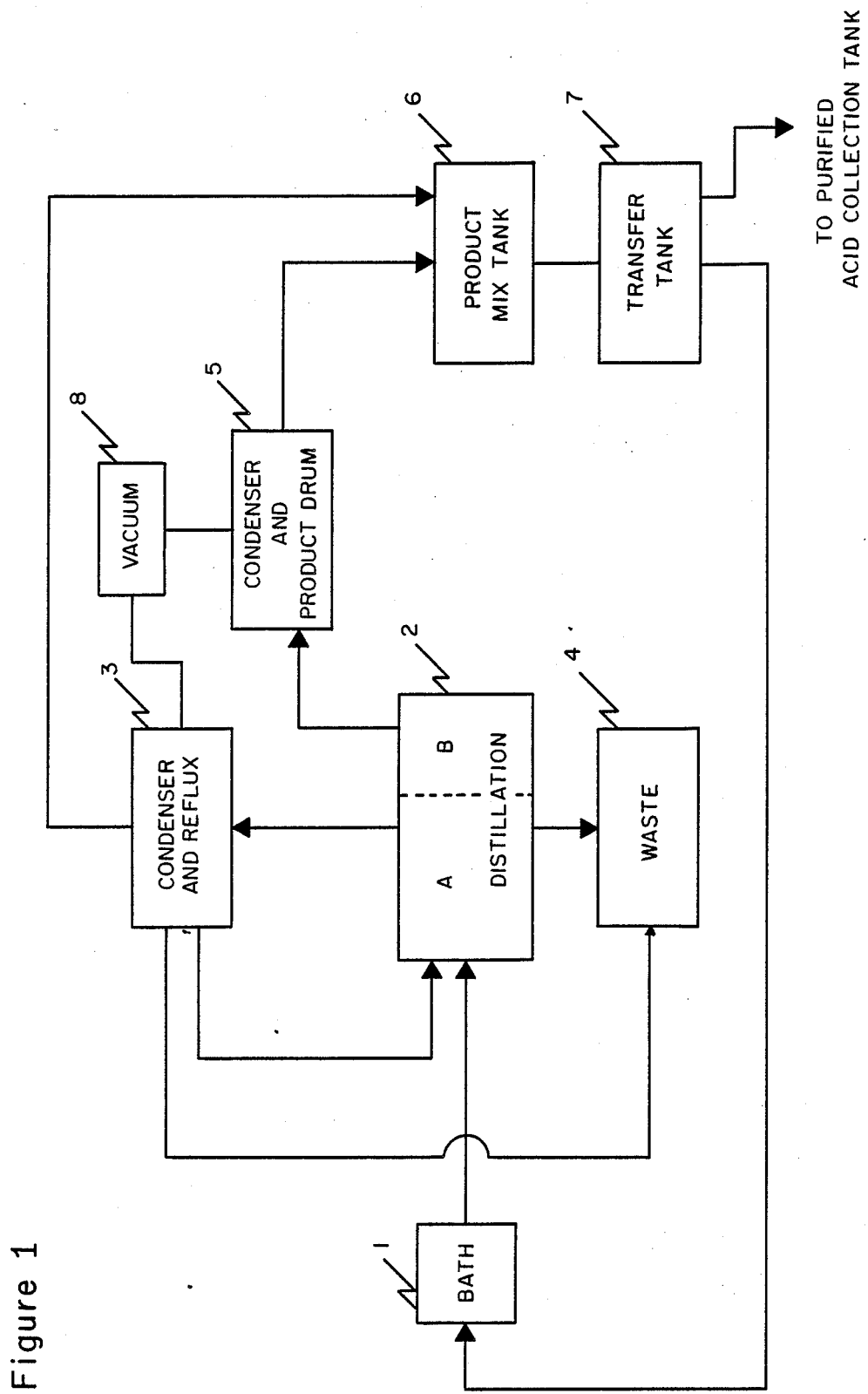
FIG. 1. Block Diagram of the hydrofluoric reprocessor.

Referring to FIG. 1, a process and apparatus for purifying and recycling spent hydrofluoric acid (HF) is described and is comprised of an input bath 1; a two-step distillation means 2A and 2B; a condensation and reflux means 3 for processing the distillate from the first distillation means 2A; a condensation and product collection means 5 for processing the boiled over product (distillate) from a second distillation means 2B; a product mix tank 6 for diluting the purified product to a desired concentration of hydrofluoric acid; a transfer tank means 7 for collecting the diluted product acid until such time the product is transferred to the etchant bath 1 or is transferred to a purified acid collection tank; a vacuum generation means 8 and a waste collection means 4 for collecting the waste for the two-step distillation process.

The acid contaminated during the etchant process ("spent acid") leaves the bath 1, which may be merely a collection vessel that collects spent HF from actual working baths (i.e. baths used to strip $SiO_2$ from semiconductor ICs) or may be itself an actual working bath. The spent acid and an amount of makeup acid are combined and fed into a two-step distillation process 2 comprised of a first distillation means 2A (shown as CL1 in FIG. 2) and a second distillation means 2B (shown as CL2 in FIG. 3). Essentially pure water is distilled off of the first distillation means 2A. The water is collected in a condensing means 3, where some of the condensed water is returned as reflux to the first distillation means 2A, while the remainder is removed to a waste receiving tank 4 or to sewer lines as local laws allow. The concentrated waste acid remaining in the first distillation means 2A is pumped into a second distillation means 2B. In the second distillation means 2B, the concentrated acid is boiled over as product and the material remaining in the second distillation means 2B is removed to a waste receiving tank 4. The product is condensed in a condensing means 5. The product is then removed to a mix tank 6 where it is mixed with ultra pure water, to obtain the desired weight percent of hydrofluoric acid. Once the concentration of the HF is properly adjusted, the product is removed from the mix tank 6 to a transfer tank 7, where it is held until needed.

Figure 3:
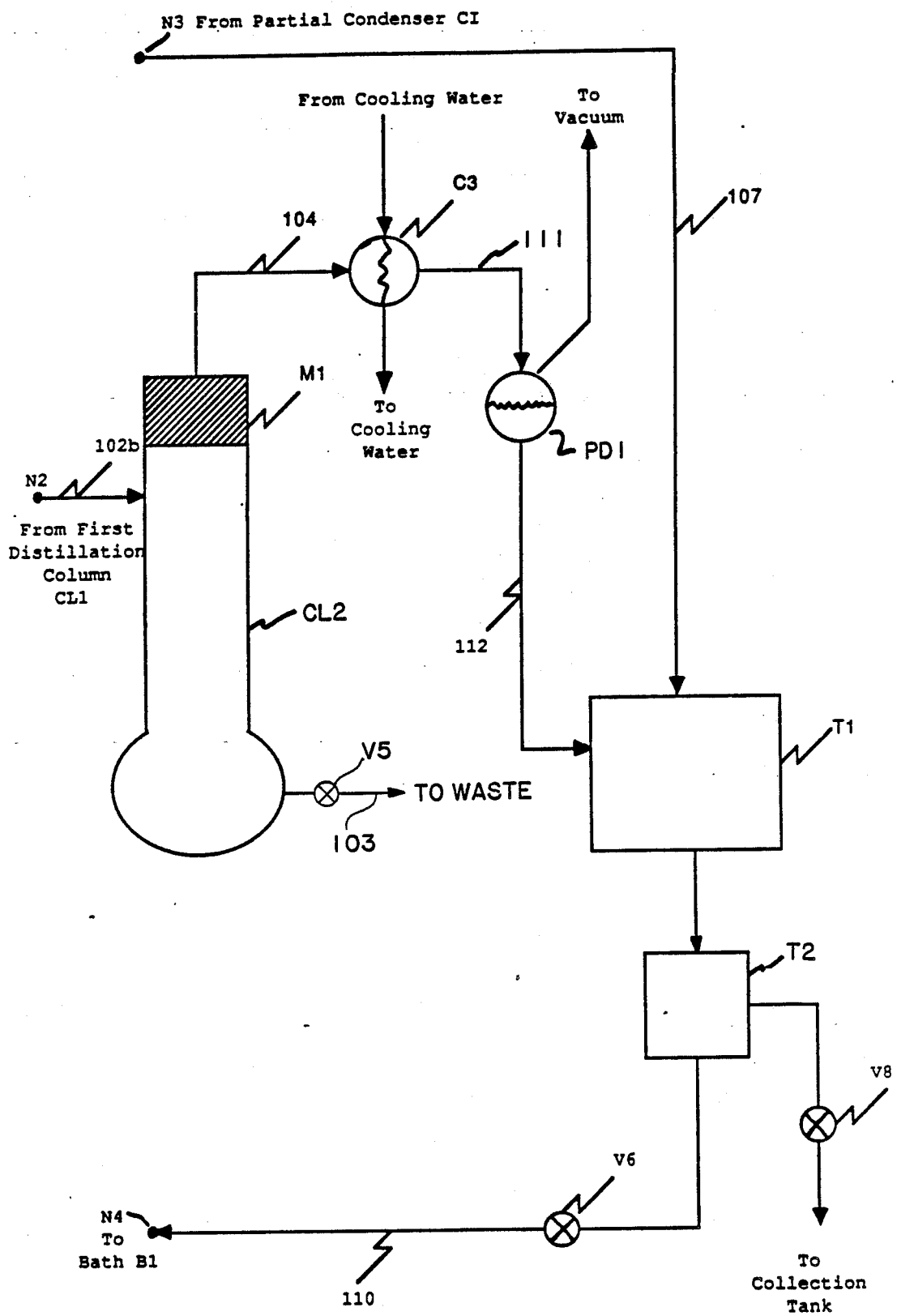
FIG. 3. Schematic representation of the second distillation column and the product mix and transfer tanks.

A specific embodiment of the apparatus and method of the invention will now be described with reference to FIGS. 2 and 3. Referring to FIG. 2, the spent hydrofluoric acid (HF) is used to etch $SiO_2$ in a bath ("bath") B1. The HF leaves the bath B1 via line 101 and passes through a valve V1. At a point beyond the valve V1, for example at N1, a measured amount of makeup acid is introduced through valve V2 into the spent acid stream, making the combined acid solution concentration approximately 7 weight percent of hydrofluoric acid. The measured amount of makeup acid is to replace the acid consumed in the semiconductor etching process and any acid that may be lost during the first distillation step and sent to the waste collection tank 4. In the preferred embodiment, prior to the introduction of the makeup acid, the process is operated at standard atmospheric pressure (760 Torr). Distillation columns CL1 and CL2 are operated under substantially vacuum conditions by momentarily opening valves V1 and V2 to introduce spent acid and makeup acid into distillation column CL1 and CL2. A standard vacuum pump system is coupled to the reflux flask RF1 which is coupled to the column C1 as shown in FIG. 2. Similarly, the standard vacuum pump system (or a second pump system) is coupled to product drum PD1 which is coupled to the column CL2 as shown in FIG. 3. Beyond valves V1 and V2, the pressure is reduced in the preferred embodiment to approximately 95 Torr by a conventional vacuum pump system. This pressure reduction allows the process to proceed at operating temperatures below 200° F. (93.3° C.) (e.g. about 150° F. for a typical implementation). Advantageously, the use of lower temperatures allows the product vessels and conduit lines to be constructed of plastic. While a number of different plastics may be employed, the preferred embodiment employs fluoroplastics such as polytetrofluoroethylene (PTFE) or perfluoroalkoxy (PFA) resins, since as a class, fluoroplastics are unaffected by reactive chemicals such as hot concentrated acids like hydrofluoric acid.

The combined stream of spent and makeup acids is then fed through line 101 into the first distillation column CL1 where the HF is concentrated from a low concentration. The distillation column CL1 is packed with a conventional plastic column packing material arranged in two groupings as shown in FIG. 2. In the first distillation step the HF is concentrated by distilling off essentially pure water. The water vapor rises through the distillation column CL1 and into line 105. The water vapor is then condensed using a partial condenser means C1 which, in the preferred embodiment has the alternative purpose of heating the ultra pure dilution water, 18 M$\Omega$ (megaohm) water (i.e. water having a resistance of 18 M$\Omega$). The condensation of the water vapor is completed in the second condenser C2 and collected in a reflux flask ("drum") RF1 from line 108. Cooling water circulates through a coil within the condenser C2 and causes the water vapor to condense. Part of the condensed water is returned as reflux along line 106. The reflux of distilled water along line 106 and through valve V7 enters the distillation column CL1 at an input pipe means located near the top of the distillation column C1. The reflux of distilled water causes distilled water to be trickled over and through the two groups of plastic column packing material and into the bottom of the distillation column C1. Valve V7 controls the amount of reflux. The reflux loop is preferred to obtain the high removal rate of HF from the distillate. The remainder of condensed material in the drum RF1 is evacuated through line 109 and valve V4 into a waste collection tank 4 or to the city sewer as local laws allow. The reduced pressure of the first distillation column CL1 is achieved by a conventional vacuum pump means which is connected to the reflux drum RF1 as shown in FIG. 2.

In an alternative embodiment, the 18 M$\Omega$ water may be heated by a conventional heating means and introduced directly into the mix tank T1. Once the ultra pure water is heated to approximately the same temperature as the clean acid, it is sent to a mix tank T1 via line 107 at N3, as illustrated in FIG. 3. In that alternative embodiment, the condenser C2 is coupled directly to the gaseous output of the column CL1 (i.e. condenser C1 is eliminated) so that the water vapor leaving CL1 enters condenser C2 directly.

The concentrated waste remaining in the first distillation column CL1 is sent to the second distillation column CL2 via line 102 at N2. A conventional pump P1, though not a requisite is used in the preferred embodiment between the first and second distillation columns CL1 and CL2 to facilitate the transfer of the concentration waste acid.

Referring to FIG. 3, the concentrated waste acid coming from the first distillation column CL1 at N2 is pumped into the second distillation column CL2, where the pressure is reduced below atmospheric. The reduced pressure of the second distillation column is achieved by the conventional vacuum pump which is coupled to the second distillation column CL2 through line 104, condenser C3, line 111 and product drum PD1 as shown in FIG. 3. The concentrated waste in column CL2 is boiled over as product and passes through a mist eliminator M1 located at the gaseous output of column CL2 to remove particulates and mist from the product vapor. The product, which has a concentration of hydrofluoric acid greater than 27 weight percent, passes through line 104 and is condensed by a condensing means C3. The product is then collected from line 111 into a product drum PD1. From the product drum PD1, via line 112, the product is transferred to a mix tank T1. The product is then mixed with an appropriate amount of ultra pure water (18 M$\Omega$ water) to dilute the HF to the desired etchant bath concentration. Once the desired concentration is obtained, the clean acid is removed from the mix tank T1 and is held in a transfer tank T2 until a further transfer through valve V6 to the bath B1 at N4 via line 110 is required. Alternatively, the purified acid product may be released, via valve V8, to a collection tank. A portion of the remnants of the second distillation ("the bottoms") are periodically removed as waste through valve V5 and line 103.

Although temperature and pressure parameters are set forth in the preferred embodiment, it is appreciated that other temperature/pressure combinations below 200° F. (93.3° C.) may be implemented to achieve the same result, without departing from the spirit and principles of the present invention.

We claim:

1. A spent hydrofluoric (HF) acid recycling and purification process comprising the steps of:
   first distilling a spent acid solution comprised of HF acid, water and waste through a first distillation means such that said water is vaporized and then condensing pure water by a condensing means coupled to the output of said first distillation means leaving a concentrated solution of HF acid and waste in said first distilling means;
   refluxing pure water through said first distillation means;
   conveying said concentrated solution of HF acid from said first distillation means to a second distillation means operating at a pressure below atmospheric pressure;
   boiling over a pure HF acid vapor from said second distillation means leaving a concentrated waste in said second distillation means;
   condensing said pure HF acid vapor into a pure HF acid solution by a second condensing means;
   collecting said pure HF acid solution in a product collection means;
   discarding said concentrated waste from said second distillation means after said pure HF acid vapor has boiled over into said second condensing means.

2. The process as recited in claim 1 wherein said boiling step includes adjusting the pressure of said second distillation means such that the operating temperature of said second distillation means is below 200° F.

3. The process as recited in claim 2 wherein said first distilling step includes adjusting the pressure of said first distillation means such that the operating temperature of said first distillation means is equal to or below the operating temperature of said second distillation means and wherein said process further comprises the step of diluting said pure HF acid solution.

4. The process as recited in claim 3 wherein said diluting step includes diluting said pure HF acid solution to a concentration less than 38 weight percent (wt %) HF with 18 megaohm (MΩ) ultra pure water.

5. The process as recited in claim 4 wherein apparatus for said process is comprised of a plastic wherein said plastic is a fluoropolymer plastic.

6. A spent hydrofluoric (HF) acid recycling and purification process comprising the steps of:
   combining a measured amount of makeup HF acid with a spent HF acid solution comprised of HF acid, water and waste to form a combination of HF acid;
   feeding said combination of HF acid into a first distillation means operating at a pressure below atmospheric pressure and having a column packing;
   first distilling said combination of HF acid such that essentially pure water is vaporized through said column packing of said first distillation means and then condensed by a condensing means coupled to the output of said first distillation means and said first distilling step leaving a concentrated combination of HF acid in the first distillation means;
   collecting said essentially pure water in a reflux container and recycling a small amount of said essentially pure water to said first distillation column and discarding the remainder of said essentially pure water;
   transferring said concentrated combination of HF acid from said first distillation means to a second distillation means operating at a pressure below atmospheric pressure;
   boiling over HF acid vapor from said second distillation means leaving said waste concentrated in said second distillation means;
   condensing said HF acid vapor into an acid solution by a second condensing means being coupled to said second distillation means to receive said HF acid vapor;
   collecting said acid solution in a product collection means;
   discarding said concentrated waste from said second distillation means after said HF acid has boiled over into said second condensing means;
   diluting said acid solution to a desired concentration of water/HF acid.

7. The process as recited in claim 6 wherein the pressure of said second distillation means is adjusted such that the operating temperature of said second distillation means is below 200° F.

8. The process as recited in claim 7 wherein the pressure of said first distillation means is adjusted such that the operating temperature of said first distillation means is equal to or below the operating temperature of said second distillation means.

9. The process as recited in claim 8 wherein said diluting step includes diluting said acid solution to a desired concentration less than 38 weight percent hydrofluoric acid with 18 megaohm (MΩ) ultra pure water.

10. The process as recited in claim 9 wherein apparatus for said process is comprised of a plastic wherein said plastic is a fluoropolymer plastic.

11. The process as recited in claim 5 wherein said essentially pure water of said refluxing step is 18 megaohm (MΩ) ultra pure water.

12. A spent hydrofluoric (HF) acid recycling and purification process for use in semiconductor fabrication comprising the steps of:
   combining a measured amount of makeup HF with a spent HF solution comprised of HF, water and waste material to form a combined solution concentration of up to 7 weight percent (wt %) of HF (combined solution);
   feeding said combined solution into a first distillation means operating at a temperature equal to or below the operating temperature of a second distillation means, wherein said first distillation means uses a packed distillation column;
   first distilling said combined solution such that essentially pure water is vaporized through said packed distillation column of said first distillation means and is then condensed by a condensing means coupled to an output of said first distillation means and such that said first distilling step leaves a concentrated combination of HF and waste material in the first distillation means;
   collecting said essentially pure water in a reflux container and recycling a small amount of essentially pure water to said first distillation column and discarding the remainder of said essentially pure water;

pumping said concentrated combination of HF and waste material from said first distillation means to said second distillation means operating at a temperature below 200° F.;

distilling over HF vapor from said second distillation means leaving said waste material concentrated in said second distillation means;

condensing said HF vapor into an ultrapure acid solution by a second condensing means coupled to a mist eliminator at an output of said second distillation means to filter said HF vapor;

collecting said ultrapure acid solution in a product collection means;

discarding said concentrated waste material from said second distillation means after said HF vapor has distilled over into said second condensing means;

diluting said ultrapure acid solution with 18 megaohm (MΩ) ultrapure water to a concentration less than 38 wt % HF.

13. The process as recited in claim 12 wherein apparatus for said process is comprised of a plastic wherein said plastic is a fluoropolymer plastic.

* * * * *